United States Patent
Winkler et al.

(10) Patent No.: US 7,239,640 B1
(45) Date of Patent: Jul. 3, 2007

(54) METHOD AND APPARATUS FOR CONTROLLING ATM STREAMS

(75) Inventors: Jorg Winkler, Alter Dorfrand (DE); Stephan Rosner, Leuckartstr (DE); Ralf Fleming, Radebeul (DE); Stephen T. Novak, Am Haideberg (DE)

(73) Assignee: Legerity, Inc., Austin, TX (US)

( * ) Notice: Subject to any disclaimer, the term of this patent is extended or adjusted under 35 U.S.C. 154(b) by 826 days.

(21) Appl. No.: 09/587,722

(22) Filed: Jun. 5, 2000

(51) Int. Cl.
*H04L 12/56* (2006.01)

(52) U.S. Cl. .................................. 370/395.7; 370/412

(58) Field of Classification Search ............ 370/395.1, 370/395.7, 359.71, 412, 413; 710/52, 56, 710/57, 308, 305, 310
See application file for complete search history.

(56) References Cited

U.S. PATENT DOCUMENTS 6,075,790 A * 6/2000 Lincoln et al. ............. 370/398
6,115,761 A * 9/2000 Daniel et al. ................ 710/57

* cited by examiner

*Primary Examiner*—Derrick W. Ferris
(74) *Attorney, Agent, or Firm*—Williams, Morgan & Amerson, P.C.

(57) ABSTRACT

The invention relates to a method and an apparatus for receiving and transmitting asynchronous transfer mode (ATM) cell streams over a bus. The invention provides a method for receiving ATM cells in a host from a client over a bus, comprising the steps of determining whether an ATM cell in a first storage device within the client is ready to be transferred over the bus to a second storage device within the host, preventing overflow of the second storage device by calculating a first available cell space in the second storage device as a function of a write value, a read value image and a size value of the second storage device, and transferring an ATM cell from the first storage device to the second storage device.

34 Claims, 4 Drawing Sheets

METHOD AND APPARATUS FOR CONTROLLING ATM STREAMS

BACKGROUND OF THE INVENTION

1. Field of the Invention

The present invention relates to a method and an apparatus for receiving and transmitting ATM cell streams over a bus.

2. Background of the Invention

The increasing demand for ATM (Asynchronous Transfer Mode) equipment having higher transfer rate, improved reliability and lower hardware complexity is prompting research in new ATM control technologies. ATM is a network technology based on transferring data in cells or packets of a fixed size. The cell used with ATM is relatively small compared to units used with other technologies. The small, constant cell size allows ATM equipment to transmit video, audio, and computer data over the same network, and assures that no single type of data occupies the line. ATM creates a fixed channel between two points whenever data transfer starts. This feature makes ATM less adaptable to sudden surges in network traffic. State of the art buffer management in ATM networks requires empty/full flag examination before a read or write operation to the buffer may be executed. Especially for transfers over a PCI (Peripheral Component Interconnect) bus, polling of these flags for every read or write operation to the buffer leads to increased control traffic over the PCI bus. Consequently, the control overhead for transferring ATM cells over a PCI bus into a buffer is high, which leads to performance disadvantages.

SUMMARY OF THE INVENTION

The present invention provides a method for receiving ATM cells in a host from a client over a bus, comprising the steps of determining whether an ATM cell in the client is ready to be transferred over the bus to a storage device within the host, and preventing overflow of the storage device by calculating a first available cell space in the storage device as a function of a write value, a read value image and a size value of the storage device.

The present invention also provides a method for transmitting ATM cells from a host to a client over a bus, comprising the steps of determining whether an ATM cell in a storage device within the host is ready to be transferred over the bus to the client, and preventing overflow of the storage device by calculating a first available cell space in the storage device as a function of a write value, a read value image and a size value of the storage device.

The present invention further provides a system for receiving ATM cells over a bus, comprising a host comprising a receiver data sink for storing ATM cells to be received, and a computer program for preventing overflow of the receiver data sink by calculating a first available cell space of the receiver data sink as a function of a read value, a write value image and a size value of the receiver data sink, and a client comprising a receiver data source for storing ATM cells to be transferred, and a finite state machine for calculating a second available cell space of the receiver data sink as a function of a write value, a read value image and a size value of the receiver data sink in order to prevent underflow of the receiver data source.

The present invention additionally provides an apparatus for transmitting ATM cells over a bus, comprising a host comprising a transmitter data source for storing ATM cells to be transferred, and a computer program for preventing overflow of the transmitter data source by calculating a first available cell space of the transmitter data source as a function of a write value, a read value image and a size value of the transmitter data source, and a client comprising a transmitter data sink for storing ATM cells to be received, and a finite state machine for calculating a second available cell space of the transmitter data source as a function of a read value, a write value image and a size value of the transmitter data source in order to prevent underflow of the transmitter data source.

The inventive system comprises a receive (RX) ATM cell stream and a transmit (TX)ATM cell stream. A PCI client (CL) comprises a receive data source (RXDSO) and a transmit data sink (TXDSI) realized as a ring buffer. A host memory (Ra) comprises a transmit data source (TXDSO) and a receive data sink (RXDSI) realized as a ring buffer. A set of software-implemented receive and transmit write pointer (RXWRP, TXWRP) and receive and transmit read pointer (RXRDP, TXRDP) is associated with each ring buffer.

In general, the status of a ring buffer having a size indicated by parameter SIZE can be represented by the number of occupied buffer entries (OC) given by the following equation:

$$OC = (WRP - RDP + SIZE) \bmod SIZE \quad (1).$$

The number of available buffer entries (A V) is given by $$AV = SIZE - OC - 1 \quad (2).$$

The write pointer WRP is updated to $$WRP = (WRP + 1) \bmod SIZE \quad (3)$$

whenever data entries are written into the buffer, whereas the read pointer RDP is updated to $$RDP = (RDP + 1) \bmod SIZE \quad (4)$$

whenever data entries are read from the buffer. For a valid write operation, the condition $AV \geq 1$ has to be fulfilled, and for a valid read operation, the condition $OC \geq 1$ has to be fulfilled.

In receive direction, RXDSO actively writes received input values over the PCI bus into RXDSI, whereby the client is updating RXWRP. The host reads input values from RXDSI for further processing and updates RXRDP. To provide both client and host with the status information of RXDSI, the host maintains an image of RXWRP, which is represented by RXWRPI, and the client maintains an image of RXRDP, which is represented by RXRDPI. Under the conditions $RXWRP \geq RXWRPI$ and $RXRDP \geq RXRDPI$ for the client, the relation $$AV(RXWRP, RXRDPI) \_ AV(RXWRP, RXRDP) \quad (5)$$

is fulfilled. Thus, buffer overflow is prevented. For the host, the relation $$OC(RXWRPI, RXRDP) \_ OC(RXWRP, RXRDP) \quad (6)$$

is fulfilled. Thus, buffer underflow is prevented. This principle assures buffer integrity in case of distributed and not permanently updated buffer status parameters.

BRIEF DESCRIPTION OF THE DRAWINGS

The above and other objects, features and advantages of the present invention will become more readily apparent from the following description, reference being made to the accompanying drawing in which.

DETAILED DESCRIPTION OF THE PREFERRED EMBODIMENT

Figure 1:
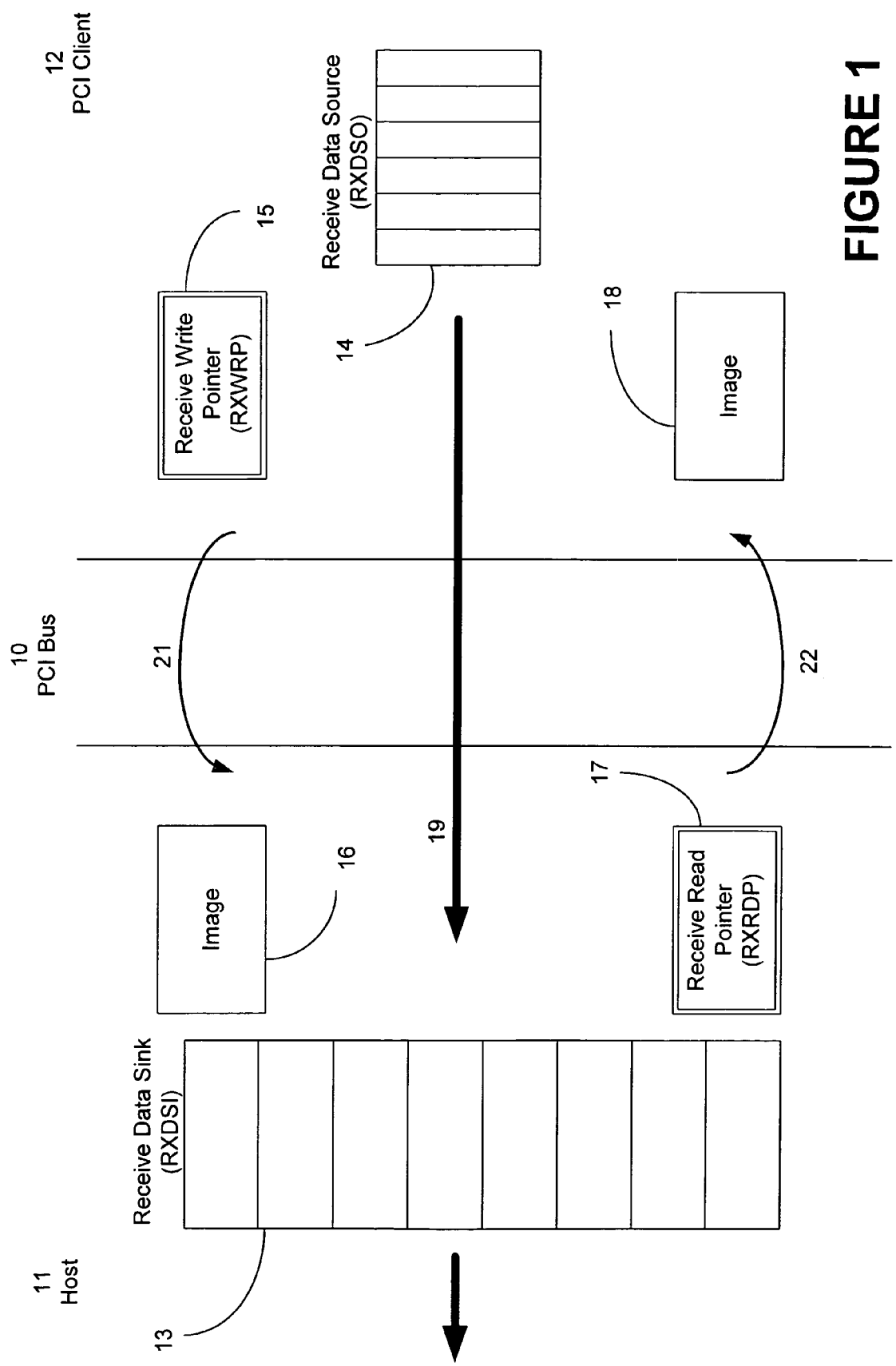
FIG. 1 is a diagram depicting the transfer of ATM cells from client to host.
Figure 2:
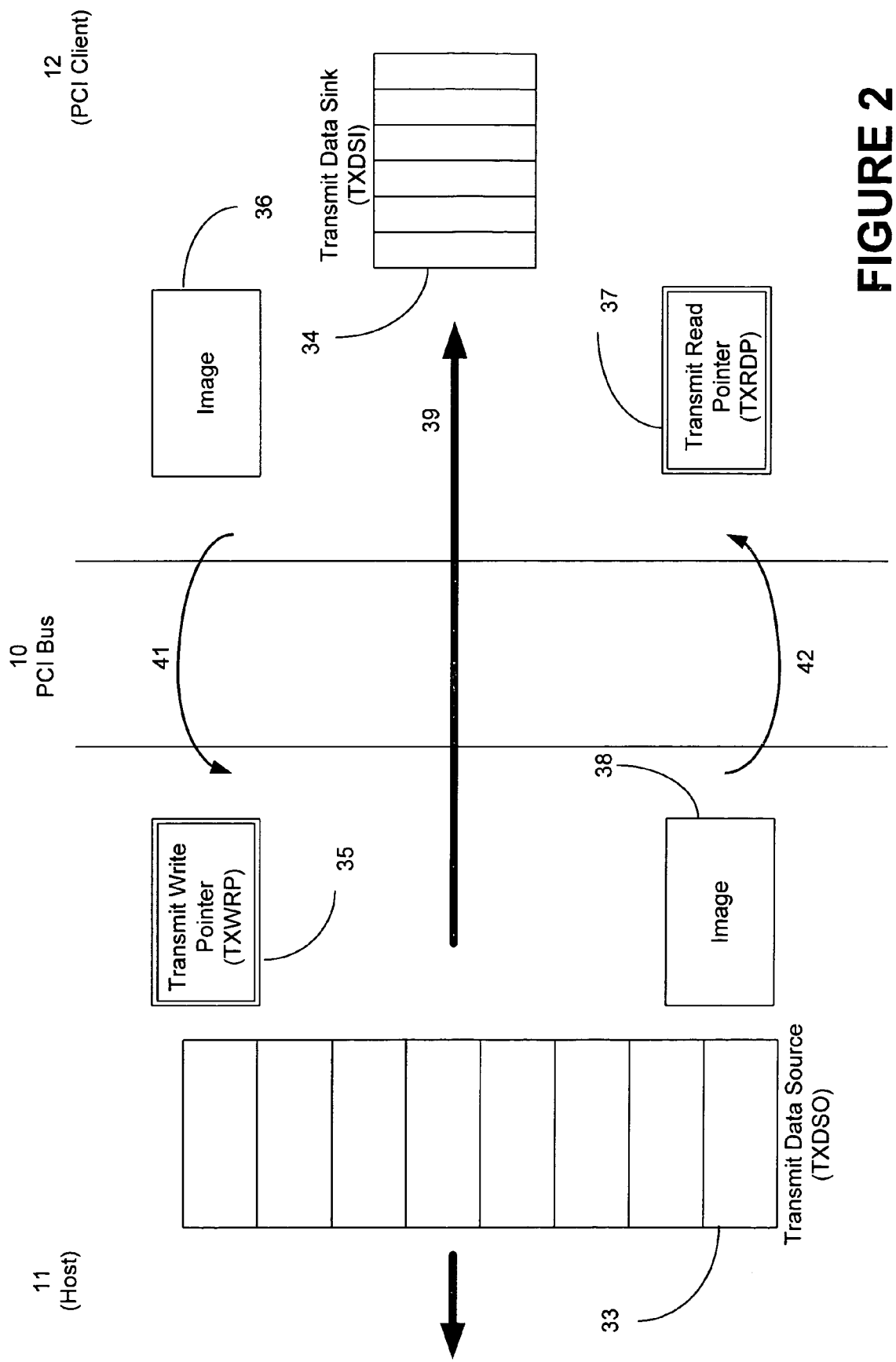
FIG. 2 is a diagram depicting the transfer of ATM cells from host to client.

Referring to FIGS. 1 and 2, there is shown a system for transmitting and receiving cell streams according to the present invention. The system comprises a host indicated generally by 11 and a PCI client indicated generally by 12. Cells are transferred over a PCI bus 10.

The PCI client 12 comprises a receive (RX) data source (RXDSO) 14 and a transmit (TX) data sink (TXDSI) 34 realized as a FIFO (first in first out) buffer. The host 11 comprises a TX data source (TXDSO) 33 and a RX data sink (RXDSI) 13 realized as a ring buffer. The client 12 further comprises a RX write pointer (RXWRP) 15 and a TX read pointer (TXRDP) 37 and the host further comprises a RX read pointer (RXRDP) 17 and a TX write pointer (TXWRP) 35.

In addition, the client 12 comprises an image 18 of the RXRDP 17 (RXRDPI) and an image 36 of the TXWRP 35 (TXWRPI) and the host includes an image 16 of the RXWRP 15(RXWRPI) and an image 38 of the TXRDP 37 (TXRDPI).

Referring now specifically to FIG. 1, a diagram of the ATM cell transfer from the client 12 to the host 11 according to one aspect of the present invention is depicted. ATM cells are transferred (arrow 19) from the RXDSO 14 over the PCI bus 10 to the RXDSI 13.

In one particular embodiment, the RXDSO 14 may comprise two possible sources of ATM data, a fast and a slow data-stream (not shown). Each of these data-streams has a physical FIFO buffer in an ADSL (asymmetric digital subscriber line) core associated to it. A DMA (direct memory access) unit (not shown) monitors a FIFO-empty indication for each of these FIFOs. When the FIFO-empty indication is deasserted, this indicates that at least one complete cell is waiting in the associated FIFO to be transferred. In the host memory, there are two receive regions (not shown) in the RXDSI 13, one for the fast and one for the slow data-stream. The transfer of ATM data is initiated by the client 12 based on the specified base address of each of the RXDSI regions and its defined size. Transfer is executed via PCI master write access. The maintenance of write and read pointers enables tracking of how many available cell entries are in the ring buffer 13, hereinafter called the AV level. In the receive direction, the client 12 is the driving force to transfer ATM data into the host ring buffer 13. Therefore, the client 12 maintains the actual value of the write pointer (RXWRP) 15, whereas the host receives an image (RXWRPI) 16 whenever it reads the RXWRP value from the host (action 21). As to the read pointer (RXRDP) 17, the host 11 maintains the actual value, whereas the client 12 receives an image (RXRDPI) 18 whenever the host 11 updates the RXRDP value (action 22). It should be noted that the host 11 is controlling and initiating the pointer update actions 21 and 22.

Referring now to FIG. 2, a diagram of the ATM cell transfer from host 11 to client 12 according to one aspect of the present invention is depicted. Therein, the ATM cells are transferred (arrow 39) from the TXDSO 33 within the host 11 over the PCI bus 10 to the TXDSI 34, which is located within the client 12.

In one particular embodiment, similarly to the receive direction, there are two possible sources of data. One is a fast and the other is a slow data-stream. The host 11 comprises two transmit regions (not shown) in the TXDSO 33, one for the fast and one for the slow data stream. The host 11 specifies the base address of each of the regions and defines its size (in cell units). These parameters are programmed into the client 12. Maintenance of read and write pointers enables tracking of how many cells are in the ring buffer 33, hereinafter called the OC level. Therefore, the client knows from where to get the ATM data and thus is able to initiate master read access over the PCI bus 10 in order to transfer the ATM data into the related transmit FIFO 34. In transmit direction, the host 11 is the driving force to transfer ATM data into the host regions. Therefore, the host maintains the actual value of the write pointer (TXWRP) 35, whereas the client receives an image (TXWRPI) 36 of it whenever the host 11 writes the WRP value to the client (action 41). As to the read pointer (TXRDP) 37, the client 12 maintains the actual value, whereas the host 11 receives an image (TXRDPI) 38 whenever the host reads the TXRDP value from the client (action 42).

Figure 3:
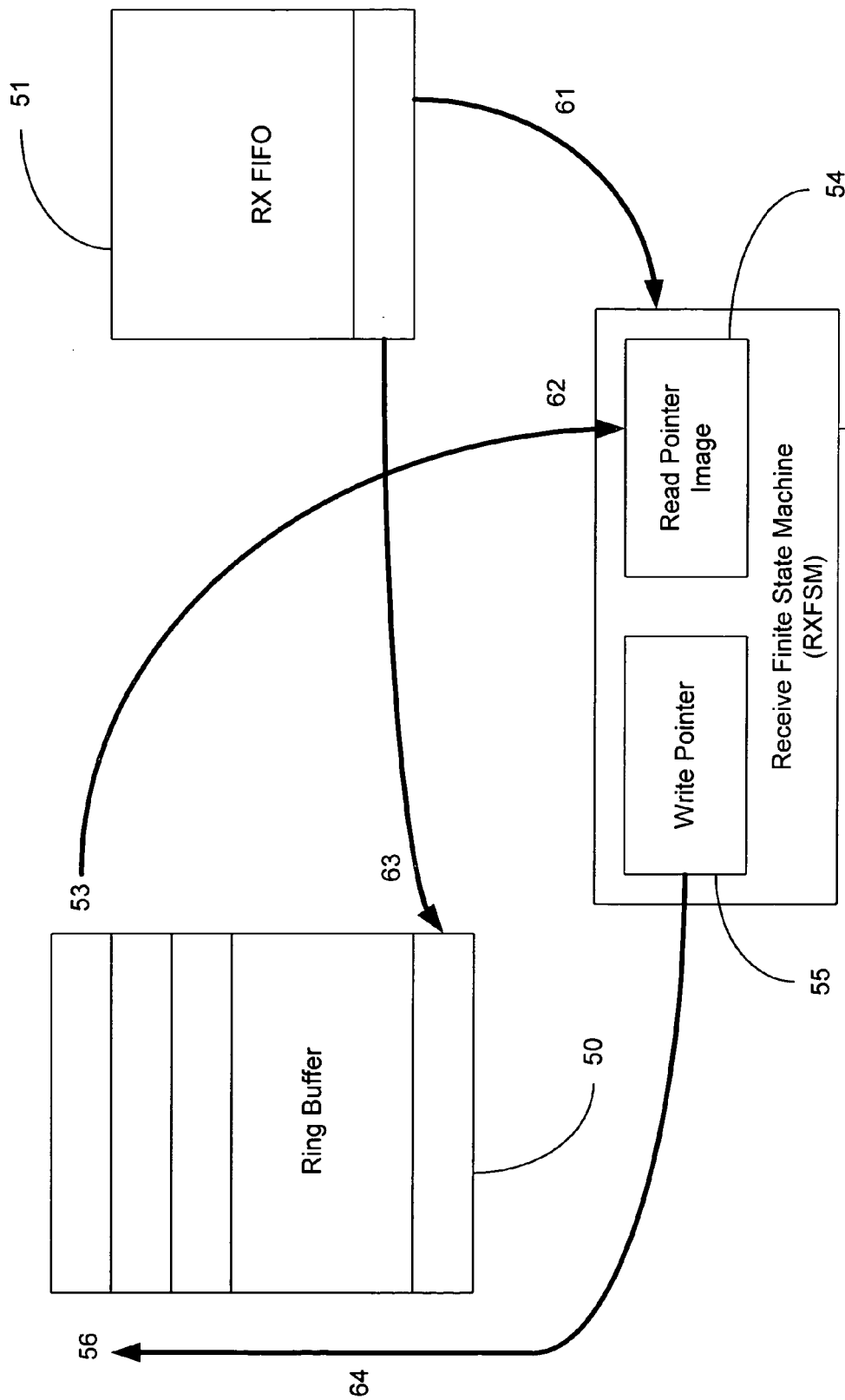
FIG. 3 is a diagram depicting the receive data transfer scheme.

Referring now to FIG. 3, a diagram of the receive data transfer scheme according to one aspect of the present invention is depicted. The recommended signaling scenario for write pointer update (action 21) and read pointer update (action 22) is outlined in the following.

In FIG. 3, the client processing is explained. Principally, the number of occupied cell entries (OC) and the number of available free cell spaces (AV) of a host ring buffer 50 can be determined based on the following equations:

$$OC = (WRP - RDPI + SIZE) \bmod SIZE \quad (7)$$

$$AV = SIZE - OC - 1 \quad (8)$$

OC and AV denote the occupied cell space and the available free cell space as_calculated by the client based on the write pointer (WRP) 55 and read pointer image (RDPI) 54 values The calculation is preferably executed by a computer program. The write and read pointers (WRP, RDPI) are essential in equations (7) and (8). It should be noted that the SIZE parameter and the WRP and RDPI values are given in cell units. Moreover, the host ring buffer 50 is considered full with (SIZE−1) cells in it. Therefore, overflow of the host ring buffer 50 can be prevented and full/empty indications do not have to be maintained.

FIG. 3 graphically describes the data transfer from RX FIFO 51 in the client to host ring buffer 50. As indicated by arrow 61, a signal initiated by RX FIFO 51 indicates that at least one ATM cell is ready to be transferred.

Based on equations (7) and (8), a receive finite state machine (RXFSM) 52 in the client calculates the number of available cell space (AV) in the host ring buffer. If the number of free cell space is lower than a programmable LOW_AV value, the client informs the host that it requires a read pointer update 62. In FIG. 3, the read pointer RDP is indicated with reference number 53. This action is realized by setting an ALMOST_FULL flag (not shown) that can optionally issue an interrupt. By updating the RDPI value 54, the host informs the client of how many cells from the host ring buffer 50 it has already processed. It should be noted that the RXFSM 52 will continue filling the host ring buffer 50 until it is actually completely filled, i.e. AV=0. If the host still has not processed the available ATM data, once the RX FIFO 51 can not accept any more data, an interrupt will be generated by the ADSL core, which is associated with it.

If there is available space in the host ring buffer, the RXFSM 52 transfers the ATM cell from the RX FIFO to the host ring buffer. This action is indicated by arrow 63.

After a programmable number of transferred cells, the RX FSM 52 will set the WRP_UPDATED flag (not shown) that can optionally issue an interrupt. The host will then "read the WRP value 55 from the client in order to get the newest snapshot WRPI 56 of how many cells have recently been written to the host ring buffer 50. This updating is indicated by arrow 64. Preferably, a timeout register (not shown) for the WRP update exists.

In the following, the host processing will be explained. Based on the read pointer (RDP) and write pointer image (WRPI) values, the host determines whether there are ATM cells available in the host ring buffer 50. The calculation is based on the following equations:

$$OC = (WRPI - RDP + SIZE) \bmod SIZE \quad (9)$$

$$AV = SIZE - OC - 1 \quad (10)$$

Similar to the client processing, OC and AV denote the occupied cell space and the available free cell space in the host ring buffer 50. As long as the condition OC>0 is fulfilled, the host can process ATM cells, whereby underflow of the host ring buffer 50 is prevented.

Figure 4:
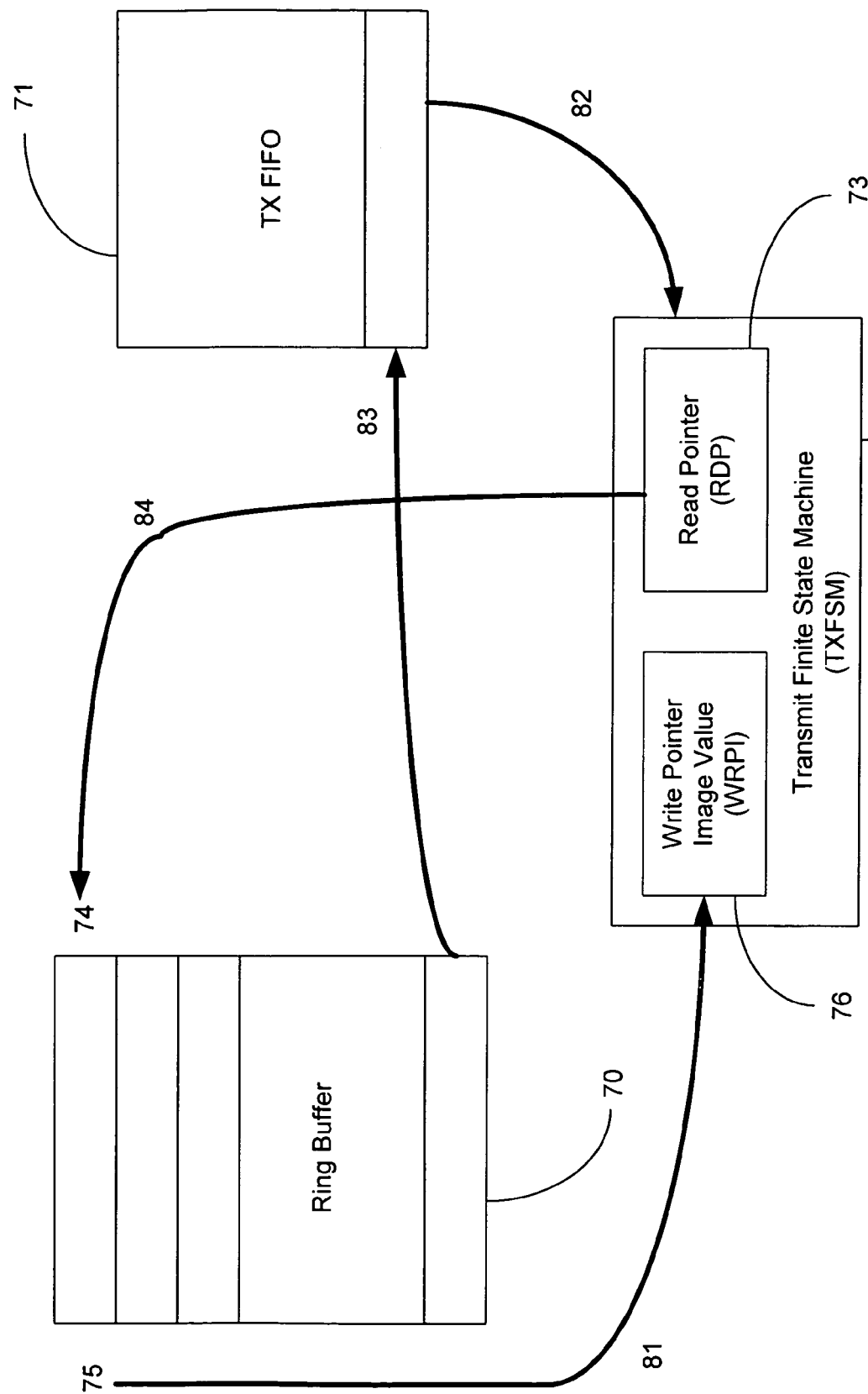
FIG. 4 is a diagram depicting the transmit data transfer scheme.

Referring now to FIG. 4, a diagram of the transmit data transfer scheme according to one aspect of the present invention is depicted.

In FIG. 4, client processing is explained. It graphically describes the data transfer from one of the host ring buffers 70 to the associated TX FIFO 71, which is located in the ADSL core. The decision whether ATM cells are available in the host ring buffer 70 is based on equations (9) and (10) (see host processing in receive direction explained above). Again, OC means occupied cell space in equation (9) and AV indicates the available free cell space in equation (10). Both values OC and AV are preferably calculated by a computer program. The parameter SIZE represents the size of the host ring buffer 70. Similarly to the receive direction, the ring buffer is considered full with (SIZE−1) cells in it. By means of this calculation overflow of the host ring buffer 70 is prevented and no FIFO full/empty indications have to be maintained. OC and AV denote the occupied cell space and the available free cell space as calculated by the client based on the WRPI 76 and RDP 73 values. Initiation of ATM data transfer from host memory to the client is executed by a write pointer update 81 from host to client. Write pointer WRP is indicated with reference number 75. If the OC value falls below a programmable LOW_OC value, the client can optionally issue an ALMOST_EMPTY interrupt to the host or can set the ALMOST_EMPTY flag (not shown). Subsequently, the host will react by updating WRPI 76, i.e. it will write the current WRP value 75 as image WRPI 76 into the client.

Under the condition of OC>0, a transmit finite state machine (TXFSM) 72 will check whether the associated TX FIFO 71 in the ADSL core can accept a cell by evaluating the FIFO full indication. This action is indicated by arrow 82.

If there is available space in the TX FIFO 71, the TXFSM 72 initiates a PCI master read transfer of the ATM cell from the appropriate host ring buffer 70 to the TX FIFO 71, as indicated by arrow 83. The TXFSM takes care of providing aligned host memory addresses when transferring an ATM cell.

After a programmable number of transferred ATM cells, the TXFSM 72 will set the RDP_UPDATED flag (not shown). If enabled, this flag can also cause an interrupt. The host will respond to this event by reading the RDP value 73 from the client. The read pointer image value (RDPI) is thereby indicated with reference number 74. Hence, the host knows how much ring buffer space can be released. This update is depicted by arrow 84. A read pointer timeout register (not shown) may also be included.

In the following, the host processing is explained. Based on equations (7) and (8) (see client processing in receive direction explained above), the host decides whether it can transfer data in the associated host ring buffer. Again, OC means occupied cell space in equation (7) and AV represents the available free cell space in equation (8). As long as the condition AV>0 is fulfilled, the host can transfer data, whereby underflow of the host ring buffer 70 is prevented.

In order to reduce implementation complexity, all pointer updates are executed by host software. In receive direction, if the number of available buffer entries AV (RXWRP, RXRDPI) reaches a programmable low threshold value LOW_AV, the client can issue an interrupt to invoke pointer updating. To minimize the total number of interrupts in the system, this interrupt can also be initiated by host software when using a software counter that initiates the pointer RXRDP update after a programmable number of ATM cells have been processed. This principle also applies for the other RX and TX pointers. The use of distributed pointers instead of typical empty/full flags allows to significantly reduce control traffic transferred over the PCI bus. Instead of polling the flags before every write or read operation to the host ring buffers, the pointer images are only updated when the OC and AV values are equal or close to zero. Additionally, buffer sizes and thresholds can be appropriately (according to the actual RX and TX data rates) tuned in order to obtain best system performance.

To fully utilize the data transfer capability of double word PCI data transfer, pointer update is organized so that in case a pointer update at the client has to be accomplished, both image pointers RXRDPI and TXWRPI are updated together. In case, a pointer update at the host has to be accomplished, both RXWRPI and TXRDPI are updated together within one PCI data transfer. Thus, a preemptive pointer update between the receive and transmit direction is accomplished, whereby no additional control costs occur. Moreover, in receive direction, available bytes in the ATM cell stream can be additionally used to indicate the cell status. Thus, the necessity to update RXWRPI is avoided.

The proposed solution allows distributed and not always updated buffer pointers while maintaining buffer integrity. Update of these pointers is executed by means of host software. Thus, hardware complexity is reduced. Control overhead for transferring ATM cells over a PCI bus into a host buffer is minimized due to threshold controlled update events, a preemptive update mechanism, and using available bytes in the ATM cell stream to indicate the cell status. Therefore, operating speed is increased and reliability and efficiency is improved.

Although preferred embodiments have been described in detail herein, it will be apparent to the expert in the relevant art that various modifications and substitutions and the like can be made within the spirit of the invention and these modifications and substitutions can be considered to be within the scope of the invention in accordance with the following claims.

What is claimed is:

1. A method for receiving asynchronous transfer mode (ATM) cells in a host from a client over a bus, comprising the steps of:

determining whether an ATM cell in said client is ready to be transferred over said bus to a storage device within said host; and preventing overflow of said storage device by calculating a first available cell space in said storage device as a function of a write value, a read value image and a size value of said storage device.

2. The method of claim 1 further comprising the step of transferring an ATM cell from said client to said storage device.

3. The method of claim 1 further comprising the step of updating said read value image.

4. The method of claim 3, wherein said read value image updating is executed upon said first available cell space falling below a programmable level.

5. The method of claim 1, wherein underflow of said storage device is prevented by calculating a second available cell space in said storage device as a function of a read value, a write value image and a size value of said storage device.

6. The method of claim 5 further comprising the step of updating said write value image.

7. The method of claim 6, wherein said write value image updating is executed upon reaching a programmable number of transferred ATM cells.

8. The method of claim 5, wherein said read value and write value image are specified by pointers associated with said storage device.

9. The method of claim 1, wherein said write value and read value image are specified by pointers associated with a storage device within said client.

10. A method for transmitting asynchronous transfer mode (ATM) cells from a host to a client over a bus, comprising the steps of:
determining whether an ATM cell in a storage device within said host is ready to be transferred over said bus to said client; and
preventing overflow of said storage device by calculating a first available cell space in said storage device as a function of a write value, a read value image and a size value of said storage device.

11. The method of claim 10 further comprising the step of transferring an ATM cell from said storage device to said client.

12. The method of claim 10 further comprising the step of updating said read value image.

13. The method of claim 12, wherein said read value image updating is executed upon reaching a programmable number of transferred ATM cells.

14. The method of claim 10, wherein underflow of said storage device is prevented by calculating a second available cell space in said storage device as a function of a read value, a write value image and a size value of said storage device.

15. The method of claim 14 further comprising the step of updating said write value image.

16. The method of claim 15, wherein said write value image updating is executed upon falling under a programmable level of said second available cell space.

17. The method of claim 14, wherein said read value and write value image are specified by pointers associated with a storage device within said client.

18. The method of claim 10, wherein said write value and read value image are specified by pointers associated with said storage device.

19. A system for receiving asynchronous transfer mode (ATM) cells over a bus, comprising:
a host comprising a receiver data sink for storing ATM cells to be received, and a computer program for preventing overflow of said receiver data sink by calculating a first available cell space of said receiver data sink as a function of a read value, a write value image and a size value of said receiver data sink; and
a client comprising a receiver data source for storing ATM cells to be transferred, and a finite state machine for calculating a second available cell space of said receiver data sink as a function of a write value, a read value image and a size value of said receiver data sink in order to prevent underflow of said receiver data source.

20. The system of claim 19, wherein said read value image is updated upon said second available cell space falling below a programmable level.

21. The system of claim 20, whereby said updating is controlled and initiated by said host.

22. The system of claim 19, wherein said write value image is updated upon reaching a programmable number of transferred ATM cells.

23. The system of claim 22, whereby said updating is controlled and initiated by said host.

24. The system of claim 19, wherein said write value and read value image are specified by pointers associated with said receiver data source and said read value and write value image are specified by pointers associated with said receiver data sink.

25. The system of claim 19, wherein said receiver data sink is a ring buffer and said receiver data source is a FIFO memory.

26. The system of claim 19, wherein said bus is a PCI bus.

27. An apparatus for transmitting asynchronous transfer mode (ATM) cells over a bus, comprising:
a host comprising a transmitter data source for storing ATM cells to be transferred, and a computer program for preventing overflow of said transmitter data source by calculating a first available cell space of said transmitter data source as a function of a write value, a read value image and a size value of said transmitter data source; and
a client comprising a transmitter data sink for storing ATM cells to be received, and a finite state machine for calculating a second available cell space of said transmitter data source as a function of a read value, a write value image and a size value of said transmitter data source in order to prevent underflow of said transmitter data source.

28. The apparatus of claim 27, wherein said read value image is updated upon reaching a programmable number of transferred ATM cells.

29. The apparatus of claim 28, whereby said updating is controlled and initiated by said host.

30. The apparatus of claim 27, wherein said write value image is updated upon falling said second available cell space below a programmable level.

31. The apparatus of claim 30, whereby said updating is controlled and initiated by said host.

32. The apparatus of claim 27, wherein said write value and read value image are specified by pointers associated with said transmitter data source and said read value and write value image are specified by pointers associated with said transmitter data sink.

33. The apparatus of claim 27, wherein said transmitter data source is a ring buffer and said transmitter data sink is a FIFO memory.

34. The apparatus of claim 27, wherein said bus is a PCI bus.

* * * * *